United States Patent [19]
Bosshart

[11] Patent Number: 4,815,019
[45] Date of Patent: Mar. 21, 1989

[54] FAST ALU EQUALS ZERO CIRCUIT

[75] Inventor: Patrick W. Bosshart, Dallas, Tex.

[73] Assignee: Texas Instruments Incorporated, Dallas, Tex.

[21] Appl. No.: 19,101

[22] Filed: Feb. 26, 1987

[51] Int. Cl.[4] ................................. G06F 7/38
[52] U.S. Cl. ................................. 364/736.5
[58] Field of Search ............. 364/788, 787, 768, 736, 364/715, 736.5

[56] References Cited

U.S. PATENT DOCUMENTS 3,983,382 9/1976 Weinberger ............ 364/768
4,638,450 1/1987 Stoffers ................. 364/715

OTHER PUBLICATIONS

Schmookler, "Design of Large ALUs Using Multiple PLA Macros" *IBM J. Res. Develop.*, vol. 24, No. 1, Jan. 1980, pp. 2-14.

Primary Examiner—David H. Malzahn
Attorney, Agent, or Firm—Thomas G. Devine; James T. Comfort; Melvin Sharp

[57] ABSTRACT

A fast ALU=0 circuit is used with a carry-select lookahead ALU. Preliminary ALU=0 signals are derived for each section of the ALU prior to a carry in signal being received by that section. When the carry in signal is received, a final comparison is made with the least significant bit of the section and the final ALU=0 signal generated. The ALU=0 computation is complete one gate delay after the ALU computation is complete.

6 Claims, 2 Drawing Sheets

FAST ALU EQUALS ZERO CIRCUIT

This invention was made with Government support under Contract Number N00039-84-C-0537 awarded by Space and Naval Warfare Systems Command, U.S. Navy. The Government has certain rights in this invention.

BACKGROUND AND SUMMARY OF THE INVENTION

The present invention relates generally to digital arithmetic logic units, and more specifically to a fast ALU=0 circuit for use with carry-select lookahead adders.

In many digital computers, a determination must often be made of whether the output of the ALU is equal to zero. If this must be done in the general case, the ALU=0 determination must be made based on the actual outputs of the ALU calculation. This result will often then be used to compute the result of a condition test. Since the ALU=0 determination cannot be made until after the ALU computation is completed, and further processing must then be done on this value, the ALU=0 computation is involved in the critical timing path for the computer.

In high speed applications, such as a microprocessor operating at more than 20 MHz, reducing delay in the critical timing path is extremely important. When gate delays are on the order of a few nanoseconds, an unecessary delay of 2 or 3 gate periods is critical. If a microprocessor is designed to operate at 40 MHz, the clock period is 25 nanoseconds. 3 gate delays of 2 nanoseconds each repreents nearly 25% of the total clock period.

It is therefore an object of the present invention to provide an ALU=0 computation circuit which minimizes the delay beyond the actual ALU computation itself. It is a further object to provide such minimum delay computation in connection with the use of a carry-select lookahead ALU.

Therefore, according to the present invention, a circuit for computing whether the result of an ALU computation is zero determines whether certain bits are zero before the ALU computation is complete. When the final ALU computation is available, only a very small number of bits need be considered to determine whether the result is zero. This determination is made with the insertion of only 1 additional gate delay after the ALU computation is complete.

The novel features which characterize the present invention are defined by the appended claims. The foregoing and other objects and advantages of the invention will hereafter appear, and for purposes of illustration, but not of limitation, a preferred embodiment is shown in the accompanying drawings.

DESCRIPTION OF THE PREFERRED EMBODIMENT

Figure 1:
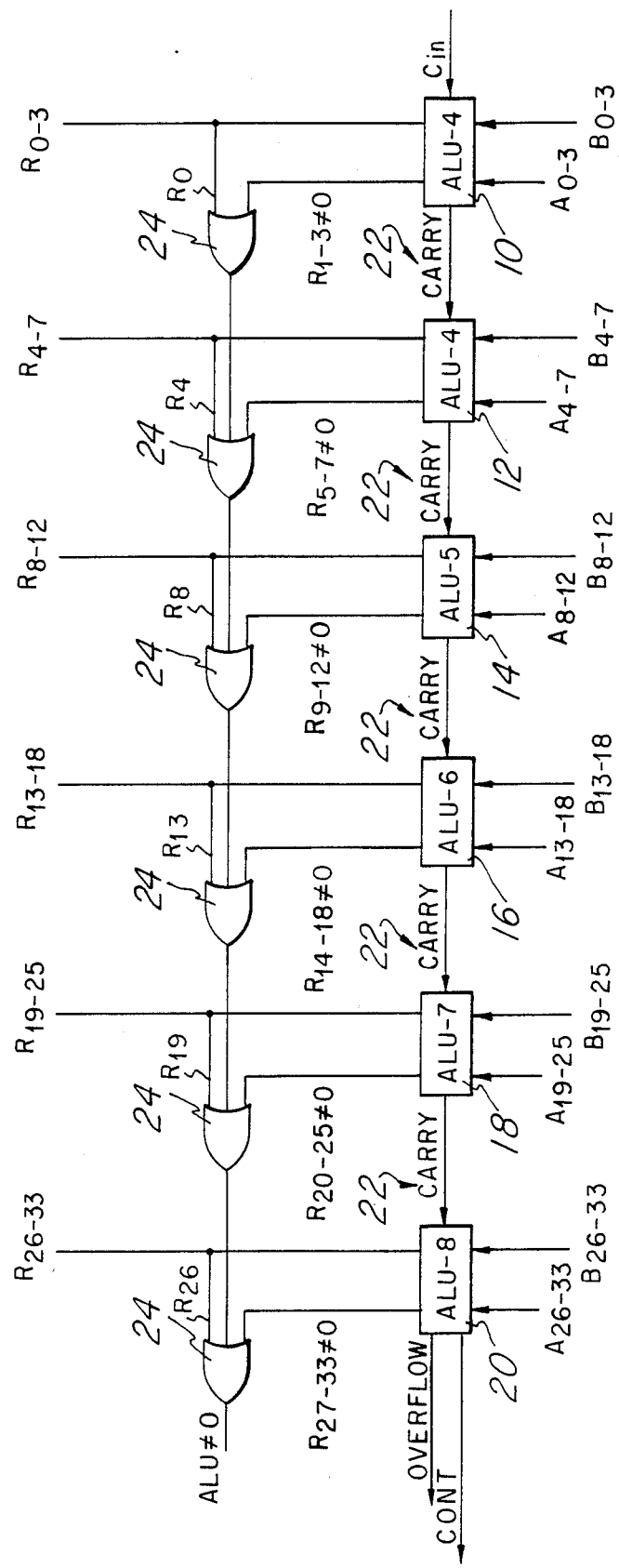
FIG. 1 is a block diagram of a 34 bit ALU circuit having fast ALU=0 computation.

FIG. 1 shows a carry-select lookahead ALU which is 34 bits wide. It is divided into sections having varying numbers of bits of the overall computation. There are 6 sections, with the two sections 10, 12 which calculate the least significant bits (LSB) each operating on 4 bits. In order of increasing significance, the remaining 4 sections 14, 16, 18, and 20 operate on 5, 6, 7, and 8 bits respectively. Each section is a ripple ALU, and inter-section carries 22 are connected between sections. The final result is a concatenation of the results of the individual sections.

For example, 5 bit ALU 14 operates on bits 8-12. Input values $A_{8-12}$ and $B_{8-12}$ are combined according to the selected operation of the ALU, giving the output bits $R_{8-12}$. The computation cannot be completed until a carry in bit is received from the preceeding section 12, and a carry out is passed to the more significant section 16 when the computation is complete. Thus, the inter-section carries must ripple the length of the ALU.

The 5 bit ALU 14 also generates a signal indicating whether the result from that section is equal to zero. For the final result to be equal to zero, the result from each section must equal zero. In the preferred embodiment, the generated signal is actually the complement of ALU=0, which is ALU$\neq$0. Both signals contain the same information, and either may be used when knowledge of ALU=0 is needed. The R$\neq$0 computation from this section 14 is OR'd with the results from the previous section, and the result is passed on to the next section. Thus, the ALU$\neq$0 computation also ripples across the ALU through OR gates 24. The R$\neq$0 computation for any section is completed one gate delay after the ALU result for that section is completed, as shown in FIG. 2.

Figure 2:
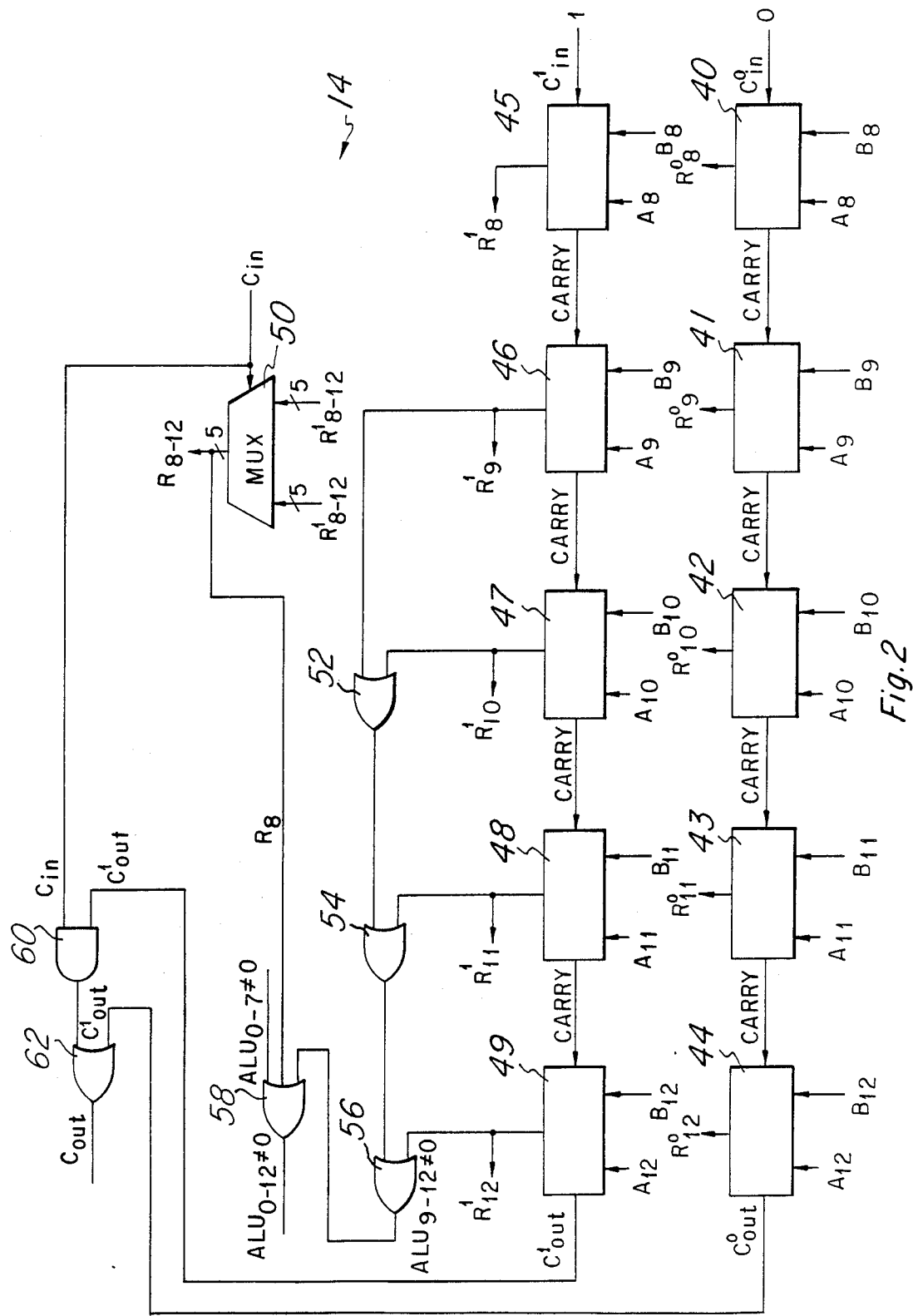
FIG. 2 is a block diagram of a portion of FIG. 1 illustrating details of the ALU of FIG. 1.

FIG. 2 is a detailed diagram for the 5 bit ALU section 14. All other sections are identical except for the number of bits they have, and the standard overflow computation in the most significant section.

Each section functions in the manner of a carry-select lookahead ALU. This involves computing two possible values for the result at the same time. Such dual computation is done without waiting for the carry in to be received. One result is computed on the assumption that the carry in will be 0, and the other is computed on the assumption that the carry in will be 1. When the actual carry in is received, it is used to select the correct computation, and no further computation is necessary.

$A_{8-12}$ and $B_{8-12}$ are combined in ALU cells 40-44 with the assumption that $C_{in}$ will be 0, giving $R_{8-12}^0$ and $C_{out}^0$. Each cell 40-44 operates on one bit of each input. Likewise, A and b are combined in cells 45-49 to give $R_{8-12}^1$ and $C_{out}^1$. $C_{in}$ controls a multiplexer 50 to select the proper result, giving $R_{8-12}$ as the final result for this section 14.

Four OR gates 52, 54, 56, and 58 comprise the ALU=0 computation circuitry for this section 14. To understand why this works, it must be observed that, if the result of the ALU truly is zero, bits $R_9^1$ through $R_{12}^1$ will always be zero, regardless of the actual value of $C_{in}$. This can be seen as follows: if $C_{in}$ actually is 1, and the result actually is zero, all $R^1$ bits are zero; this is the actual computation. If $C_{in}$ is actually 0, and the result is actually 0, then bits $R_9^1$ through $R_{12}^1$ will still be zero, and $R_8^1$ will be one. Bits $R_{9-12}^1$ are always zero if the actual ALU computation is zero, regardless of the actual $C_{in}$, so that $R^1$ is never off by more than the LSB of the section when the actual ALU result is 0. Thus the most significant 4 bits can be used to make a preliminary determination of ALU$\neq$0 before the actual carry in arrives. This is done in OR gates 52, 54, and 56.

Eventually, the outputs of all bits will be OR'd together to determine whether the result is zero. If any bit is one, the test for ALU=0 will fail. Note that the signal ALU≠0 must be inverted to provide the AU=0 information. If any of the most significant 4 bits in this section 14 are 1, $ALU_{9\text{-}12}{}^1 \neq 0$ will be 1, indicating the ALU=0 test fails.

In any event, the outputs from each OR gate are available one gate delay after the latest result connected to that gate is available. The bits of the result ripple through the section, and the AU≠0 signal ripples through the section one gate delay later. One gate delay after the last result bit $R_{12}{}^1$ is available, the $ALU_{9\text{-}12} \neq 0$ input to the last OR gate 58 is available. Note that $R_{12}{}^1$ and $R_{12}{}^0$ become available at the same time.

The $C_{in}$ signal is available at approximately the same time as the most significant bit of the result $R_{12}$ of this section. This is true for all sections except the first because of the increasing bit width in each section. In the first section, $C_{in}$ is available at the beginning of the computation.

$C_{in}$ is also used to compute $C_{out}$ from this section 14. $C_{in}$ is combined with $C_{out}{}^1$ and $C_{out}{}^0$ in gates 60 and 62 as shown to generate $C_{out}$, which is the carry signal into the next section.

When $C_{in}$ becomes available, both alternative results and carry computations have just completed. $C_{in}$ controls the multiplexer 50, so that the correct result $R_{8\text{-}12}$ is available one gate delay later. ALU≠0 for the previous section is available one gate delay after $C_{in}$, at the same time that $R_8$ is available, assuming a single gate delay in the multiplexer 50. $ALU_{0\text{-}7} \neq 0$ and $R_8$ are also coupled to the OR gate 58, and the $ALU_{0\text{-}12} \neq 0$ signal for this section is available to the next section one gate delay after that. It is seen that the determination of ALU≠0 ripples across the ALU one gate delay behind the inter-section carry signals. The final determination of ALU≠0 is available only one gate delay after the final result. This is the minimum delay given the assumption that the actual ALU results must be used.

The reason that overall delay is minimized is that partial determinations are made prior to the actual results of the computation becoming known for each section. Once the result is known, only one bit needs to be checked to make the determination. This is the LSB in each section. ($R_8$ is FIG. 2)

It will be apparent to those skilled in the art that various modifications can be made to this design. For example, a different size ALU, or different sized sections, can be used. If the ALU has no sections at all, the ALU≠0 signal can simply ripple down the ALU one gate delay behind the carry signal.

Another modification would be to simply OR all of the MSB's of each section together in a single gate, and use that output to OR with the final result of the LSB of that section and the incoming ALU≠0. However, this has the drawback of using large, many input OR gates, which are slower than 2 or 3 input gates, as well as being more difficult to place during VLSI chip design.

Another simple change would be to use different logic gates, such as NOR or NAND gates, to compute the ALU≠0 signal. Using different gates has no effect on the theory of operation of this circuit; OR gates were used in the preferred embodiment to simplify the explanation. Any layout which performs the logically equivalent operations to those described here may be used.

TECHNICAL ADVANTAGES

A fast ALU=0 circuit as described above decreases the number of computations which must be made in the critical timing path of a processor. The determination is available only one gate delay after the final result of the AU computation. This circuit works for any computation performed by the ALU, such as add, subtract and logical operations. It is easily laid out in a VLSI circuit design.

The present invention has been illustrated by the circuits described above, and it will be apparent to those skilled in the art that various modifications may be made. Such modifications fall within the spirit of the invention, the scope of which is defined by the appended claims.

What is claimed is:

1. A method for determining whether the result of an ALU computation is zero, comprising the steps of:
   (A) grouping bits of the ALU into preselected sections, each section containing a plurality of adjacent ALU bits;
   (B) applying input numbers to the ALU;
   (C) providing a carry in signal for the preselected section containing the least significant ALU bits;
   (D) for each preselected section of bits, performing the following substeps (a)-(h):
      (a) computing a result for the preselected section of bits under the assumption that a carry in signal will be 0;
      (b) computing a result for the same preselected section of bits under the assumption that a carry in signal will be 1;
      (c) determining if all bits, except the least significant bit, of the result of step (b) are equal to 0;
      (d) receiving a carry in signal;
      (e) using the signal of step (d) to select the result of step (a) or step (b);
      (f) determining if the least significant bit selected in step (e) is 0;
      (g) if steps (c) and (f) both indicate that the result bits are 0, then indicating that the selected result of this preselected section of bits is 0; and
      (h) if either of steps (c) and (f) indicate one or more bits not equal to 0, then indicating that the selected result of this preselected section of bits is not 0; and
   (E) combining the results of steps (g) and (h) for each preselected section to indicate whether the overall ALU result is zero.

2. The method of claim 1, wherein the preselected sections are grouped to have, from least significant to most significant, non-decreasing numbers of bits.

3. The method of claim 2, wherei the two preselected sections having the least significant bits each have N bits, the preselected group having the next most significant bits has N+1 bits, and each next preselected group of more significant bits, except for the preselected group of most significant bits, has 1 more bit than the previous preselected group of less significant bits.

4. The method of claim 3, wherein the preselected group of most significant bits has less than 1 more bit than the previous preselected group of less significant bits.

5. A carry-select lookahead ALU capable of determining whether the AU result from an operation is 0, comprising;

a plurality of sections, wherein each section contains a plurality of adjacent ALU bits and performs ALU operations thereon, wherein each section receives a carry in signal from any previous section operating on less significant bits and generates a carry out signal to any next section operating on more significant bits, and wherein each section computes a result assuming that the carry in will be 1 and a result assuming that the carry in will be 0, and selects the correct result when the actual carry in signal is received;

combinational logic, in each section, coupled to all bits of the section result which assumes the carry in signal will be 1, except the least significant bit of the section, for indicating whether those bits in that section are all 0; and output signal logic, in each section, coupled to the combinational logic of that section, the least significant bit of the section result after the actual carry in signal is received, and to any output signals from the previous section operating on less significant bits, said output signal logic generating an output signal indicating whether all ALU bits of less or equal significance to the most significance bit of the section are all 0.

6. The ALU of claim 5, wherein said combinational logic logically ORs the result bits, and wherein said output signal logic logically ORs its inputs to generate its output signal.

* * * * *